United States Patent [19]

Comte

[11] Patent Number: 5,468,693

[45] Date of Patent: Nov. 21, 1995

[54] LEAD-FREE GLASSES EXHIBITING CHARACTERISTICS OF CRYSTAL

[75] Inventor: Marie J. M. Comte, Velizy, France

[73] Assignee: Corning Incorporated, Corning, N.Y.

[21] Appl. No.: 333,718

[22] Filed: Nov. 3, 1994

[30] Foreign Application Priority Data

Dec. 10, 1993 [FR] France ................... 93 14881

[51] Int. Cl.⁶ .................................. C03C 3/078
[52] U.S. Cl. .................. 501/72; 501/69; 501/70
[58] Field of Search .................. 501/67, 69, 70, 501/72

[56] References Cited

U.S. PATENT DOCUMENTS

| | | |
|---|---|---|
| 3,464,932 | 9/1968 | Connelly et al. . |
| 3,723,143 | 3/1973 | Faulstich . |
| 3,805,107 | 4/1974 | Boyd . |
| 3,808,154 | 4/1974 | Omori . |
| 4,084,976 | 4/1978 | Hinton . |
| 4,089,693 | 5/1978 | LaGrouw et al. . |
| 4,224,074 | 9/1980 | Nigrin . |
| 4,277,286 | 7/1981 | Boyd et al. . |
| 4,282,035 | 8/1981 | Nigrin . |
| 4,285,731 | 8/1981 | Nigrin . |
| 4,590,171 | 5/1986 | Nigrin . |
| 4,734,388 | 3/1988 | Cameron et al. . |
| 5,108,960 | 4/1992 | Boek et al. . |
| 5,270,269 | 12/1993 | Hares et al. . |

FOREIGN PATENT DOCUMENTS

2097872  12/1993  Canada .
0553586A1  8/1993  European Pat. Off. .
0560555A2  9/1993  European Pat. Off. .
0594222A1  4/1994  European Pat. Off. .

OTHER PUBLICATIONS

Chemical Abstracts, vol. 115, No. 6, 12 Aug. 1991, Columbus, Ohio; abstract No. 55421m, p. 364 & JP-A-3 012 337 (Nippon Electric Glass Co., Ltd.) 21 Jan. 1991.

Chemical Abstracts, vol. 111, No. 12, 18 Sep. 1989, Columbus, Ohio; abstract No. 101885y, p. 292; & JP-A-1 103 993 (Nippon Electric Glass Co., Ltd.) 21 Apr. 1989.

*Primary Examiner*—Karl Group
*Attorney, Agent, or Firm*—Angela N. Nwaneri; Clinton S. Janes, Jr.

[57] ABSTRACT

The present invention relates to the production of lead-free glasses exhibiting densities of at least 2.9 g/cm³ and refractive indices of at least 1.545 which consist essentially, in weight percent, of

| | | | |
|---|---|---|---|
| $SiO_2$ | 51–63 | $Al_2O_3$ | 0–5 |
| $Li_2O$ | 0–3 | $ZrO_2$ | 0–6 |
| $Na_2O$ | 0–8 | $SiO_2 + Al_2O_3 + ZrO_2$ | 55–66 |
| $K_2O$ | 0–12 | $TiO_2$ | 0–3 |
| $Li_2O + Na_2O + K_2O$ | 7–15 | CaO | 0–5 |
| SrO | 0–<8 | MgO | 0–3 |
| BaO | >13–21 | $B_2O_3$ | 0–3 |
| ZnO | 5–15 | $La_2O_3$ | 0–8. |
| SrO + BaO + | 27–34 | | |

4 Claims, No Drawings

LEAD-FREE GLASSES EXHIBITING CHARACTERISTICS OF CRYSTAL

FIELD OF THE INVENTION

This invention relates to glasses essentially free from lead displaying the physical characteristics of lead-containing crystal glasses.

BACKGROUND OF THE INVENTION

Among the glasses used for the aesthetics or decoration of the table, crystal occupies an exceptional place: its brightness, its density, and its sonority make it a much esteemed material. In addition, it exhibits the characteristics of formability at moderate temperatures, of having a long working range, and of being able to be easily cut and polished.

It is known that this group of above numerated properties is due to the presence of lead oxide in the glass composition. But lead is a toxic element and its usage imposes so many constraints on the level of production of the products as well as its use in products designed for use in contact with food. During manufacturing, regulations govern, for example, the handling of lead-containing products and the treatment of the production wastes. In use, it is known that lead present in the glass can migrate into the food that is in contact with the glass which can lead to risks for the consumer. This migration is especially observed when the glass is in contact with an acid medium, for example, fruit juices or alcoholic beverages. Therefore, regulations limit the maximum acceptable lead release for products designed to be in contact with food.

As a rule, when the glass composition and the manufacturing process are well controlled, the amounts of lead released are very minute. However, over the past few years a tendency to strengthening the regulations has been observed. Consequently, there exists a need for glasses containing no lead, but having the properties and a manufacturing cost similar to those of crystal.

The present invention seeks to satisfy this need in disclosing glasses suitable for use as tableware and/or decorative crystal glassware meeting the following requirements:

(1) a glass density of at least 2.9 g/cm$^3$;

(2) an index of refraction of at least 1.545;

(3) the glass displays a pleasant sonority;

(4) the glass exhibits a moderate linear coefficient of thermal expansion (lower than 100×10$^{-7}$/°C. between 0°–300° C.) in order not to be too sensitive to thermal shock;

(5) the viscosity of the glass at high temperature is close to that of crystal; the temperature at which the glass exhibits a viscosity of 10 Pa.s (100 poises) does not exceed 1470° C.; and (6) the viscosity of the glass at the liquidus temperature is greater than 600 Pa.s (6000 poises).

SUMMARY OF THE INVENTION

More precisely, the invention relates to glasses essentially free from lead having the following compositions, expressed in terms of weight percent on the oxide basis. By essentially free from lead, I mean that no substantive amount is purposely added to the glass batch which would affect the properties of the glass. Preferably, lead will be entirely absent, but this is not always possible because batch materials may contain lead as an impurity.

| | | | |
|---|---|---|---|
| $SiO_2$ | 51–63 | $Al_2O_3$ | 0–5 |
| $Li_2O$ | 0–3 | $ZrO_2$ | 0–6 |
| $Na_2O$ | 0–8 | $SiO_2 + Al_2O_3 + ZrO_2$ | 55–66 |
| $K_2O$ | 0–12 | $TiO_2$ | 0–3 |
| $Li_2O + Na_2O + K_2O$ | 7–15 | $CaO$ | 0–5 |
| | | $MgO$ | 0–3 |
| $SrO$ | 0–<8 | $B_2O_3$ | 0–3 |
| $BaO$ | >13–21 | $La_2O_3$ | 0–8 |
| $ZnO$ | 5–15 | | |
| $SrO + BaO + ZnO$ | 27–34 | | |

BaO, ZnO, and SiO$_2$ are utilized in order to obtain the required density and index of refraction.

BaO is the most effective component for raising the index and the density. In addition, it provides a lower cost increase than ZnO and SrO. However, its level must be maintained below 21% to avoid unacceptable devitrification.

ZnO is preferred to SrO because SrO tends to give a yellow color to the glass, its cost is relatively high, and it raises the thermal expansion of the glass more than ZnO.

The level of Si$_2$+A$_2$O$_3$+ZrO$_2$ must be maintained at least 55% to impart acceptable chemical durability to the glass.

Li$_2$O plays a favorable role regarding the viscosity of the glass. However, its content is limited to 3% because of its cost. The other components such as ZrO$_2$, B$_2$O$_3$, TiO$_2$, CaO, MgO, and La$_2$O$_3$ can be added to adjust the properties of the glass. To illustrate:

ZrO$_2$ exhibits an interesting effect with respect to the density and the refractive index of the glass. But in amounts higher than 6%, it leads to glasses difficult to melt and displaying an acceptable devitrification.

TiO$_2$ demonstrates an interesting effect on the refractive index of the glass, but it leads to a yellow coloration in the glass, this color being more intense as the level of Fe$_2$O$_3$ comprising an impurity in the batch materials increases. Its amount must be limited to 3% and is preferably essentially excluded when a colorless glass is desired.

In order to obtain a colorless or very low colored material having a high visible transmission, as is often valued for articles designed for the table or for decoration, it is necessary that the level of impurities in the glass be low. A level of Fe$_2$O$_3$ less than 150 ppm is, for example, desirable.

Coloring components such as the transition metal oxides or the rare earth metal oxides can also be added in a total amount less than 0.1% to mask the tint imparted by the impurities. These components can also be added in higher amounts to color the material, if one desires a colored glass.

As$_2$O$_3$ and Sb$_2$O$_3$ can also be added in the usual proportions to perform their customary role as fining agents.

The preferred glasses of the invention have the following compositions, expressed in terms of weight percent on the oxide basis:

| | | | |
|---|---|---|---|
| $SiO_2$ | 53–62 | $ZnO$ | 8–13 |
| $Li_2O$ | 0–2 | $SrO + BaO + ZnO$ | 27–32 |
| $Na_2O$ | 2–7 | $CaO$ | 0–5 |
| $K_2O$ | 3–11 | $Al_2O_3$ | 0–3 |
| $Li_2O + Na_2O + K_2O$ | 8–14 | $ZrO_2$ | 0–4 |
| $SrO$ | 0–3 | $SiO_2 + Al_2O_3 + ZrO_2$ | 56–65 |
| $BaO$ | 15–19 | | |

Glasses having compositions within those ranges exhibit an interesting compromise between the different properties, those related to the ease of manufacturing as well as those related to the final product. For example, the low levels of $Li_2O_3$ and SrO enable the cost of the composition to be limited. The simultaneous presence of $Na_2O$ and $K_2O$ facilitates melting of the glass.

PRIOR ART

The concern regarding the release of lead where a glass is to be used in tableware application has given rise to the production of lead-free enamels and glazes for use in coating and decorating food service ware. Illustrations of such materials can be found in the following U.S. Pat. Nos.: 4,084,976 (Hinton), 4,224,074 (Nigrin), 4,282,035 (Nigrin), 4,285,731 (Nigrin), and 4,590,171 (Nigrin). The properties of those glasses, however, do not correspond to those exhibited by fine crystal glass.

Lead-free glasses have also been utilized in the fabrication of faceplates for television receiver tubes in order to avoid the development of a brownish discoloration resulting from the impingement of high velocity electrons, with accompanying X-radiation, upon PbO-containing glasses. The following United States patents are illustrative of such glasses: U.S. Pat. Nos. 3,464,932 (Connelly et al.), 3,805,107 (Boyd), 4,089,693 (LaGrouw et al.), 4,277,286 (Boyd et al.), 4,734,388 (Cameron et al.), 4,830,990 (Connelly), and 5,108,960 (Boek et al.). The glasses disclosed therein vary in composition and properties from those of the present invention.

U.S. Pat. No. 5,270,269 (Hares et al.) is also directed to the production of lead-free fine crystal glassware and, as such, is deemed to comprise the most pertinent prior art. The glasses disclosed therein consist essentially, in weight percent, of

| | | | |
|---|---|---|---|
| $SiO_2$ | 54–64 | BaO | 8–13 |
| $Li_2O$ | 0–3 | SrO | 8–13 |
| $Na_2O$ | 0–6.5 | ZnO | 5.5–9 |
| $K_2O$ | 0–7 | BaO+ SrO+ SnO | 22–33 |
| $Li_2O + Na_2O + K_2O$ | 8–15 | | | wherein at least two of $Li_2O$, $Na_2O$, and $K_2O$ are present and are present in essentially equimolar ratios.

As can be observed, however, the BaO content of the subject inventive glasses is greater than the maximum permitted in the glasses described in the patent, and the level of SrO is lower than the minimum demanded in the glasses of the patent. Furthermore, the present inventive glasses have no requirement that at least two alkali metal oxides be present in equimolar amounts.

DESCRIPTION OF PREFERRED EMBODIMENTS

The invention will now be illustrated through the following non-limiting examples.

EXAMPLES

The appended table presents examples of compositions and properties. The compositions are recorded in terms of parts by weight, but, because the sum of the components totals or closely approximates 100, for all practical purposes, the individual values can be deemed to reflect weight percent. In each case, 3000 grams of batch materials were melted for 4 hours at 1500° C. in a platinum crucible. Thereafter, the molten glasses were formed into bars and measurements performed thereon. Whereas these examples reflect only laboratory experiments, the glasses of the invention can be manufactured in industrial plants utilizing classical glass melting and forming techniques.

In order to evaluate the chemical durability of the glasses, three tests have been carried out.

(1) A test of hydrolytic resistance (DIN 12111). In order to have a durability comparable to that of crystal, the level of the $Na_2O$ analyzed after attack by water must be less than 120 µg/g.

(2) A test of acid durability (ACID). The test is carried out on polished samples immersed for 3 hours in a boiling aqueous solution of 20% by volume HCl. To have a satisfactory durability, the weight loss must be less than 30 mg/dm².

(3) A test of alkali durability (ISO 695). The test is carried out on polished samples immersed into an alkaline solution. To have a satisfactory durability, the weight loss must be less than 230 mg/dm².

The viscosity-temperature values in terms of Pa.s and °C., the viscosity at the liquidus temperature in terms of Pa.s, the linear coefficient of thermal expansion (0°–300° C.) in terms of $\times 10^{-7}$/°C., the density in terms of g/cm³, the softening point (S.P.), annealing point (A.P.), and strain point (St.P.) in terms of °C., and the index of refraction were determined in accordance with measuring techniques conventional in the glass art.

Examples 1–6 belong to the preferred composition area.

Examples 7–10 are outside of the preferred area but are within the scope of the invention.

Examples 11–15 are outside of the scope of the invention for the following reasons:

In Examples 11, 12, and 13 the level of BaO and that of BaO+SrO+ZnO are too low and the glasses do not exhibit the required density or refractive index.

In Example 14 the level of BaO is too high and the glass demonstrates unacceptable devitrification.

In Example 15 the sum BaO+ZnO+SrO is too high and the viscosity at the liquidus is too low.

Example 1 is the most preferred glass.

TABLE

| | 1 | 2 | 3 | 4 | 5 | 6 |
|---|---|---|---|---|---|---|
| $SiO_2$ | 57.5 | 57.1 | 57.0 | 59.0 | 56.2 | 53.9 |
| $Li_2O$ | 0.4 | — | 0.4 | 1.6 | 1.6 | 1.5 |
| $Na_2O$ | 4.8 | 5.15 | 3.0 | 4.9 | 4.8 | 4.7 |
| $K_2O$ | 7.1 | 7.75 | 9.7 | 3.7 | 3.6 | 3.6 |
| $Li_2O + Na_2O + K_2O$ | 12.3 | 12.9 | 13.1 | 10.2 | 10.0 | 9.8 |
| SrO | — | — | — | — | — | 2.9 |

|  | | | | | |
|---|---|---|---|---|---|
| BaO | 17.7 | 17.5 | 17.5 | 18.1 | 17.8 | 17.6 |
| ZnO | 11.2 | 11.2 | 11.1 | 11.5 | 11.3 | 11.2 |
| SrO + BaO + ZnO | 28.9 | 28.7 | 28.7 | 29.6 | 29.1 | 31.7 |
| $Al_2O_3$ | 1.0 | 0.95 | 0.95 | 1.0 | 1.0 | 1.0 |
| $ZrO_2$ | — | — | — | — | 3.4 | 3.4 |
| $SiO_2 + Al_2O_3 + ZrO_2$ | 58.5 | 58.05 | 57.95 | 60.0 | 60.6 | 58.3 |
| $Sb_2O_3$ | 0.28 | 0.28 | 0.28 | 0.29 | 0.28 | 0.28 |
| Temp. for a Viscosity of 10 Pa.s | 1420 | 1427 | 1433 | 1396 | 1391 | 1350 |
| Temp. for a Viscosity of 100 Pa.s | 1181 | 1190 | 1193 | 1146 | 1167 | 1137 |
| Temp. for a Viscosity of 1000 Pa.s | 1021 | 1032 | 1034 | 983 | 1015 | 993 |
| S.P. | 711 | 723 | — | 682 | 713 | — |
| A.P. | 519 | 532 | — | 497 | 521 | — |
| St.P. | 474 | 485 | — | 451 | 474 | — |
| Liquidus Viscosity | 1400 | 5000 | 2000–5000 | 1000 | >1300 | 1000–2000 |
| Expansion | 94 | — | — | — | — | — |
| Density | 2.93 | — | 2.92 | 2.93 | 3.0 | 3.06 |
| Refractive Index | 1.547 | 1.545 | — | 1.55 | 1.563 | 1.571 |
| DIN 12111 | 65 | 47 | 66 | — | — | — |
| ACID | 8 | 10.7 | — | 1.5 | 2.0 | 1.65 |
| ISO 695 | 162 | 137.4 | — | 135 | 52.4 | 55.0 |

|  | 7 | 8 | 9 | 10 | 11 |
|---|---|---|---|---|---|
| $SiO_2$ | 57.8 | 54.6 | 58.8 | 57.6 | 59.5 |
| $Li_2O$ | 0.6 | 0.6 | 2.75 | 0.4 | 1.7 |
| $Na_2O$ | 4.5 | 4.4 | 2.4 | 3.6 | 3.6 |
| $K_2O$ | 6.9 | 6.7 | 3.7 | 8.4 | 5.4 |
| $Li_2O + Na_2O + K_2O$ | 12.0 | 11.7 | 8.85 | 12.4 | 10.7 |
| SrO | 7.8 | 7.0 | 7.3 | — | 10.5 |
| BaO | 13.8 | 17.2 | 18.0 | 18.3 | 10.5 |
| ZnO | 7.3 | 5.5 | 5.7 | 9.5 | 7.5 |
| SrO + BaO + ZnO | 28.9 | 29.7 | 31.0 | 27.8 | 28.5 |
| $Al_2O_3$ | 1.0 | 3.7 | 1.0 | 0.1 | 1.0 |
| $SiO_2 + Al_2O_3 + ZrO_2$ | 58.8 | 58.3 | 59.8 | 57.7 | 60.5 |
| $Sb_2O_3$ | 0.29 | 0.28 | 0.29 | 0.29 | 0.28 |
| $B_2O_3$ | — | — | — | 1.5 | — |
| Temp. for a Viscosity of 10 Pa.s | 1396 | 1415 | — | 1386 | 1375 |
| Temp. for a Viscosity of 100 Pa.s | 1160 | 1173 | — | 1149 | 1130 |
| Temp. for a Viscosity of 1000 Pa.s | 1000 | 1014 | — | 994 | 971 |
| S.P. | 699 | — | — | — | 675 |
| A.P. | 513 | — | — | — | 498 |
| St.P. | 469 | — | — | — | 456 |
| Liquidus Viscosity | 2500 | 1200 | >600 | 2000 | — |
| Expansion | 93 | — | — | — | 88 |
| Density | 2.919 | — | 2.95 | 2.92 | 2.88 |
| Refractive Index | 1.548 | — | 1.556 | — | 1.548 |
| DIN 12111 | — | — | — | — | 53 |
| ACID | 10 | 15 | — | — | 2.08 |
| ISO 695 | 175.5 | — | — | — | 159 |

|  | 12 | 13 | 14 | 15 |
|---|---|---|---|---|
| $SiO_2$ | 59.2 | 60.2 | 56.6 | 56.8 |
| $Li_2O$ | — | 0.6 | 1.6 | 1.6 |
| $Na_2O$ | 5.3 | 4.7 | 3.4 | 4.8 |
| $K_2O$ | 8.0 | 7.2 | 5.1 | 1.0 |
| $Li_2O + Na_2O + K_2O$ | 13.3 | 12.5 | 10.1 | 7.4 |
| SrO | — | 4.8 | — | 2.9 |
| BaO | 10.4 | 12.0 | 24.8 | 17.9 |
| ZnO | 15.7 | 3.8 | 7.1 | 13.7 |
| SrO + BaO + ZnO | 26.1 | 20.6 | 31.9 | 34.5 |
| $Al_2O_3$ | 1.0 | 1.0 | 0.95 | 1.0 |
| $SiO_2 + Al_2O_3 + ZrO_2$ | 60.2 | 61.2 | 57.55 | 57.8 |

TABLE-continued

| | | | | |
|---|---|---|---|---|
| Sb$_2$O$_3$ | 0.29 | 0.3 | 0.28 | 0.29 |
| B$_2$O$_3$ | — | — | — | — |
| CaO | — | 5.2 | — | — |
| Temp. for a Viscosity of 10 Pa.s | 1469 | 1405 | 1354 | 1358 |
| Temp. for a Viscosity of 100 Pa.s | 1230 | 1167 | 1117 | 1126 |
| Temp. for a Viscosity of 1000 Pa.s | 1068 | 1012 | 961 | 976 |
| S.P. | 748 | — | — | — |
| A.P. | 551 | — | — | — |
| St.P. | 501 | — | — | — |
| Liquidus Viscosity | >10000 | 3000–10000 | <600 | <600 |
| Expansion | 88 | — | — | — |
| Density | — | 2.82 | 3.0 | 3.03 |
| Refractive Index | 1.539 | 1.546 | 1.556 | 1.561 |
| DIN 12111 | 62 | — | — | — |
| ACID | — | 4 | 10.5 | 0.4 |
| ISO 695 | — | — | 204 | — |

I claim:

1. Glasses essentially free from lead characterized in that they exhibit a density of at least 2.9 g/cm$^3$ and an index of refraction of at least 1.545, and which consist essentially of the following compositions, expressed in terms of weight percent on the oxide basis, of

| | | | |
|---|---|---|---|
| SiO$_2$ | 53–62 | ZnO | 8–13 |
| Li$_2$O | 0–2 | SrO + BaO + ZnO | 27–32 |
| Na$_2$O | 2–7 | CaO | 0–5 |
| K$_2$O | 3–11 | Al$_2$O$_3$ | 0–3 |
| Li$_2$O + Na$_2$O + K$_2$O | 8–14 | ZrO$_2$ | 0–4 |
| SrO | 0–3 | SiO$_2$ + Al$_2$O$_3$ + | 56–65. |
| BaO | 15–19 | | |

2. Glasses according to claim 1 also containing up to 0.1% total of at least one transition metal oxide or rare earth metal oxide.

3. Tableware and/or decorative crystal glassware consisting of glasses essentially free from lead characterized in that they exhibit a density of at least 2.9 g/cm$^3$ and an index of refraction of at least 1.545, and which consist essentially of the following compositions, expressed in terms of weight percent on the oxide basis, of

| | | | |
|---|---|---|---|
| SiO$_2$ | 53–62 | ZnO | 8–13 |
| Li$_2$O | 0–2 | SrO + BaO + ZnO | 27–32 |
| Na$_2$O | 2–7 | CaO | 0–5 |
| K$_2$O | 3–11 | Al$_2$O$_3$ | 0–3 |
| Li$_2$O + Na$_2$O + K$_2$O | 8–14 | ZrO$_2$ | 0–4 |
| SrO | 0–3 | SiO$_2$ + Al$_2$O$_3$ + | 56–65. |
| BaO | 15–19 | | |

4. Tableware and/or decorative crystal glassware according to claim 3 also containing up to 0.1% total of at least one transition metal oxide or rare earth metal oxide.

* * * * *

UNITED STATES PATENT AND TRADEMARK OFFICE
CERTIFICATE OF CORRECTION

PATENT NO. : 5,468,693
DATED : November 21, 1995
INVENTOR(S) : Marie J. M. Comte It is certified that error appears in the above-identified patent and that said Letters Patent is hereby corrected as shown below:

In the Abstract, last line,
"SrO+BaO+" should read --SrO+BaO+ZnO--.

Column 2, line 23, "$Si_2+A_2O_3+ArO_2$"
should read --$SiO_2+Al_2O_3+ZrO_2$--.

Column 7:

Claim 1, last line, "$SiO_2+Al_2O_3+$"
should read --$SiO_2+Al_2O_3+ZrO_2$--.

Claim 3, last line, "$SiO_2+Al_2O_3+$"
should read --$SiO_2+Al_2O_3+ZrO_2$--.

Signed and Sealed this

Twenty-seventh Day of February, 1996

Attest:

BRUCE LEHMAN

*Attesting Officer*    *Commissioner of Patents and Trademarks*